J. W. JAY.
WEEDLESS FISH HOOK.
APPLICATION FILED JUNE 17, 1916.
1,215,938.
Patented Feb. 13, 1917.
2 SHEETS—SHEET 1.
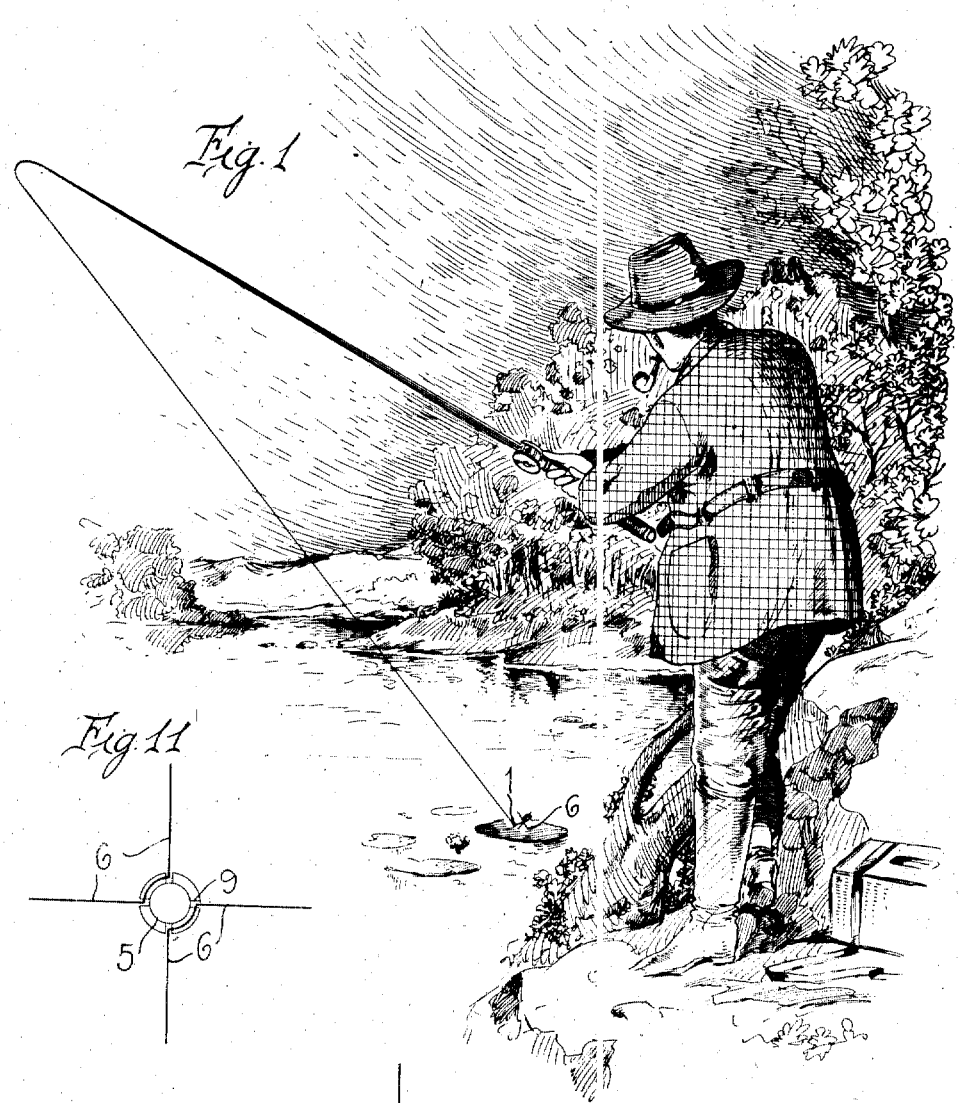
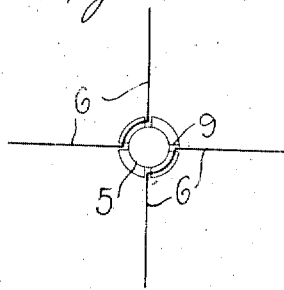
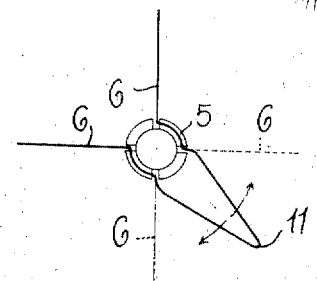
Inventor
J. W. Jay
By Frederick S. Still
Attorney

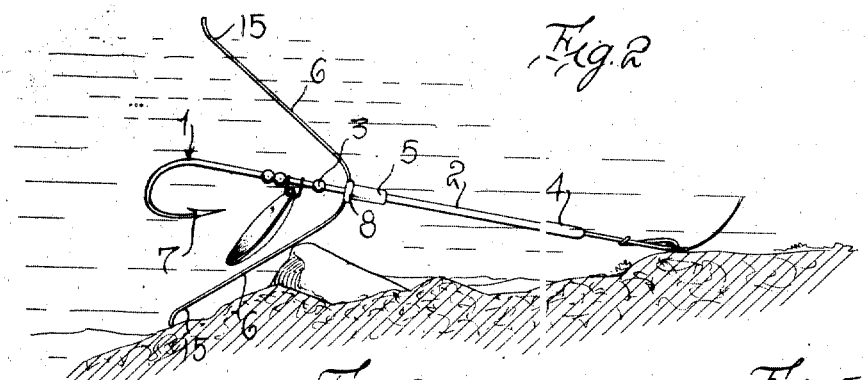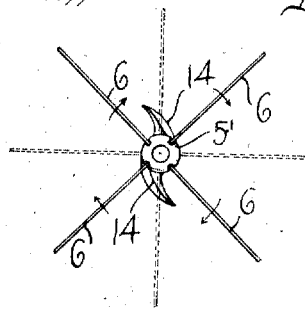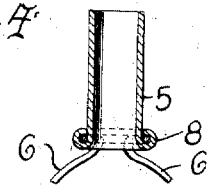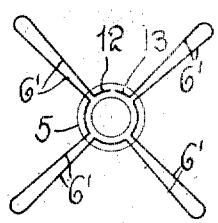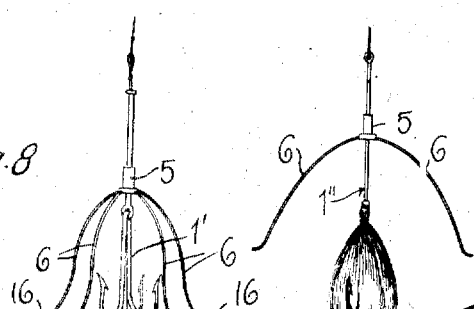

UNITED STATES PATENT OFFICE.

JAMES WILLIAM JAY, OF PHILADELPHIA, PENNSYLVANIA.

WEEDLESS FISH-HOOK.

1,215,938.  Specification of Letters Patent.  Patented Feb. 13, 1917.

Application filed June 17, 1916.  Serial No. 104,254.

*To all whom it may concern:*

Be it known that I, JAMES WILLIAM JAY, a citizen of the United States, residing at Philadelphia, in the county of Philadelphia and State of Pennsylvania, have invented certain new and useful Improvements in Weedless Fish-Hooks, of which the following is a specification.

This invention comprehends certain new and useful improvements in weedless fish-hooks, designed to prevent weeds or snags from catching on the point or bill of the hook as it is pulled through the water; and the invention has for its primary object a simple, durable and efficient device of this character which will possess to a maximum degree the advantage of being capable of positively protecting the hook from becoming entangled in or with weeds and the like, and without affording any obstacle whatever to the fish "striking" the bait or lure.

To those familiar with the art of fishing, and particularly casting, it is well known that in fishing for bass and similar fish, the best place for finding fish, especially the "big fellows," is usually where the weeds, docks, cat-tails and similar vegetation are the thickest, and that one's ability to get his baited hook into the thickest of this vegetation is an important factor in his success. Heretofore, so-called weedless fishhooks have been placed upon the market that are effective enough so far as their weedless characteristics are concerned, but are in that regard so effective that if a fish strikes the bait, it is hard for him to get the hook, so that a great many of these hooks thus far produced and placed before the public, while they have been weedless hooks, have been fishless hooks also.

With a knowledge of these conditions, my invention aims principally, as above stated, to produce a hook of this character which will effectively protect the hook from weeds and the like, while at the same time the guard forming part of the hook, or an adjunct thereof or attachment thereto, will be moved away from the point of the hook by the slightest touch of the fish so that the fish will have unobstructed access to the point of the hook.

Another object of the invention is to produce a device of this character which can be very easily made and used with any of the ordinary or conventional types of hook now in vogue; as, for example, a tandem hook, a hook with a spoon or spinner, a double or treble hook, a buck-tail or feathered hook, and a plain shank hook, and without interfering in any way with the functions of the hook itself, but on the other hand, properly protecting the hook from the weeds and the like.

A further object of the invention is an improved weedless hook in which the guard is mounted to freely turn or rotate about the shank of the hook as an axis, and is also free to move longitudinally on the shank within predetermined limits, whereby the prongs of the guard, when any of them are struck by a fish at any angle in the direction of the caster, will either turn the guard to such a position as to properly expose the bill or point of the hook to the fish, or will result in bodily moving the guard upward away from the point or bill, while on the other hand, as soon as my improved hook reaches the water and the caster begins to draw it in, the guard will be instantly moved down to surround and protect the point of the hook. For instance, if the hook should alight upon a lily pad or the like, the two lowermost prongs in whatever position the guard may strike the pad, will hold the point of the hook elevated and prevent it from becoming caught in the pad, or from becoming entangled with the underlying weeds.

A still further object of the invention is a device of this kind in which the guard itself may be provided with vanes or blades whereby it will be caused to rotate in the water as the hook is drawn therethrough.

The invention has for a still further object an improved weedless hook in which the parts of the guard are so constructed and arranged that they may be very easily and quickly manufactured at a very low cost and will not be liable to become broken or readily deformed.

And the invention also aims to generally improve devices of this character so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawings, in which—

Figure 1 is a perspective view showing an application of one form or embodiment of my improved weedless fishhook, Fig. 2 (Sheet 2), is a side view of a hook of the spoon or spinner type equipped with my improved guard, it being understood that the invention is also applicable to any other of the conventional types of hook as hereinbefore specified, Fig. 3 is a detail view of the guard, with blades or vanes attached to or forming part of the sleeve thereof, Fig. 4 is a detail view of this form of sleeve by itself, Fig. 5 is an enlarged detail sectional view of said sleeve of the guard.

Fig. 6 is an end view of the sleeve,

Fig. 7 is a fragmentary perspective view of the sleeve,

Fig. 8 is a side view of a treble hook embodying the improvements of my invention, Fig. 9 is a similar view of a buck-tail hook so equipped, Fig. 10 is a view in the nature of a diagram illustrating how the arms of the prongs of the guard may be of double formation and readily assembled with the sleeve, Fig. 11 (Sheet 1) is a similar view illustrating another embodiment whereby the guard may be formed, and Fig. 12 is a similar view showing still another manner in which the guard may be formed.

Corresponding and like parts are referred to in the following description and designated in all of the views of the accompanying drawings by like reference characters.

Referring to the drawings, the numeral 1 designates a hook which may be of any desired type or design as hereinbefore stated, and which is provided with a straight shank 2 of the usual degree of stiffness, said shank being of any desired length, according to the requirements of the case and being formed with stops 3 and 4 disposed in predetermined spaced relation to each other and formed in any desired way, but preferably constituting integral parts of the shank such as would result by solder or the like applied to the shank in any approved manner. My improved guard comprises a sleeve 5 which is mounted to turn upon the shank and slide longitudinally thereon between the stops 3 and 4, said sleeve having attached thereto and extending downwardly and outwardly therefrom a plurality of prongs 6 that are four in number in the present instance, and disposed in equidistant relation to each other, said prongs being formed of piano wire or any other wire which will possess the requisite strength and resilience. It is to be particularly noted that the prongs 6 are of such a length that when the sleeve 5 is at the lower limit of its movement upon the shank 2 of the hook 1, abutting against the lowermost stop 3, the free extremities of the prongs will lie in a plane, transversely considered, beyond the barbed point 7 of the hook and encompass same upon all sides whereby, as the hook is drawn through the water toward the caster as he "reels in," all liability of the point catching upon weeds, snags or the like will be positively precluded, and whereby should the hook fall upon a lily pad or the like, when casting upon the surface of the water, the guard will support the point of the hook, with the bait or lure thereon, in an elevated position, as illustrated in Fig. 1, and prevent the hook from sinking down into the weeds with the point unprotected.

It is obvious, owing to the freedom with which the guard may turn axially upon the shank and also slide longitudinally thereon, that the slightest touch of the fish upon any one of the prongs will turn the guard around so as to expose the hook, or instantly slide the guard bodily along the shank with the same result, so that, while the point of the hook is effectually prevented from becoming entangled in the weeds or similar vegetation, the guard will not in any wise tend to prevent the fish from becoming caught.

In the preferred construction and arrangement of the parts, the sleeve 5 is formed of a single piece of metal or any other suitable substance or material provided at its lowermost end with a bead 8 in which the upper portions of the prongs or arms 6 are crimped or clenched, as best illustrated in Figs. 5, 6 and 7. The sleeve, in manufacture, is first formed at one end with the desired number of slits 9 arranged at equal distances apart, and the metal between the slits is crimped up and around the upper portions of the prongs so as to hold them securely, while at the same time all sharp bends are avoided which would tend to weaken the construction of the guard.

Referring now particlarly to Figs. 6 and 11, it will be seen that the arms 6 and sleeve 5 may be very readily formed and connected together. For example, two pieces of wire of suitable strength and resiliency may be employed to form the four prongs. One piece of wire may be passed upward through one of the slits 9 and around the sleeve 5 and then down through the next adjacent slit so as to form two prongs and an intermediate curved cross bar 10 (see Fig. 6), the cross bars of the two bars or arms that are thus formed being securely held in the bead 8 subsequently formed all around the sleeve, a drop of solder or the like being preferably added and furnishing a most rigid construction.

Instead of using two separate pieces of wire for this purpose, one may be employed. For example, as best illustrated in Fig. 12, the wire may be passed up through one of the slits and then around the sleeve and down through the next adjacent slit, may be then crimped and extended upwardly through the next slit and around and down through the fourth slit, the crimped or returned portions of the wire being subsequently cut apart at the point 11 and separated to produce the four-arm symmetrical structure.

Or again, by employing the method illustrated diagrammatically in Fig. 10, the arms of the prongs may be of double formation. A single piece of wire may be taken and started at the point 12, then extended down through one of the slots and doubled upon itself and around to the next slot, the operation being repeated successively at the other slots, and the other end of the wire terminating contiguous to the portion 12, as indicated at 13 in Fig. 10. The arms of double formation are designated 6'.

If desired, the sleeve may be provided with any desired number of vanes or blades such as are indicated at 14 in Figs. 3 and 4, whereby the sleeve, here designated 5' and the prongs or arms 6 carried thereby may be caused to rotate as the hook is drawn through the water.

It is to be understood that my device may be used with equal facility with other forms or types of hooks than those illustrated in Figs. 1 and 2, as, for example, a double hook, a treble hook such as is shown at 1' in Fig. 8, or a feathered or buck-tail hook such as is indicated at 1'' in Fig. 9.

The prongs may terminate in either straight extremities or extremities curved slightly outward, as indicated at 15, in Fig. 2, or in blunt extremities, either plain or formed with knobs, as indicated at 16 in Fig. 8.

From the foregoing description, in connection with the accompanying drawings, it will be manifest that I have provided a very simple, durable and efficient construction of weedless fishhook, the parts of which may be very easily and cheaply made and readily assembled and not liable to get out of order, and the advantageous features of which will be at once appreciated upon reference to the foregoing description and the various views of the accompanying drawing.

It will also be understood that as the prongs or arms of the guard are pliable, they may be very easily bent down and held close around the shank of the hook by means of a ring or rubber band encompassing them, so that the device may be packed away in a tackle box or elsewhere and occupy a minimum amount of space. Furthermore, it is to be noted that my improved weedless hook does not depend upon the pliability of the prongs to insure the fish getting hooked, but moves entirely out of the way when the fish strikes, while at the same time the prongs being pliable may be easily bent and expose the hook, should it happen that a fish would strike the device at such an angle as to render the revolving and longitudinal sliding movement practically impossible, although a contingency of this kind is very remote. In other words, the pliability of the prongs or arms of the guard gives it the same advantage that is possessed by the other guards that are immovable on the shank of the hook, my guard possessing the additional and very important advantageous feature of susceptibility of an easy revolving and longitudinal sliding movement.

While the accompanying drawings illustrate what I believe to be the preferred embodiments of my invention, yet it is to be understood that the invention is not limited thereto, but that various changes may be made in the construction, arrangements and proportions of the parts without departing from the scope of the invention as claimed.

What is claimed is:

1. A weedless fishhook, comprising in combination a hook having the usual stiff shank, said shank being provided with stops thereon in spaced relation to each other longitudinally on the shank and a guard embodying a sleeve mounted to freely turn and slide longitudinally upon said shank between said stops, and limited in its longitudinal movement by the latter and a plurality of prongs connected to said sleeve and extending outwardly and downwardly therefrom and of a length to encompass the bill of the hook with their extremities when the guard is in abutting relation to the lowermost stop of the shank.

2. A weedless fishhook, comprising in combination a hook having the usual stiff shank, said shank being provided with stops thereon in spaced relation to each other longitudinally of the shank, and a guard embodying a sleeve mounted to freely turn and slide longitudinally upon said shank between said stops and limited in its longitudinal movement by the latter, and a plurality of prongs connected to said sleeve and extending outwardly and downwardly therefrom and of a length to encompass the bill of the hook with their extremities when the guard is in abutting relation to the lowermost stop of the shank, said prongs being disposed in equidistant relation from each other projecting from the sleeve and designed to support the bill of the hook elevated should the hook when cast alight upon a floating object.

3. A weedless fishhook, the shank of which is provided with upper and lower stops in spaced relation to each other, and a guard embodying a sleeve mounted for a freely revoluble and longitudinal movement upon the shank between said stops, said guard being formed at one end with a bead, and wire prongs extending downwardly and outwardly from said sleeve and including cross bars that are clenched in said bead, as and for the purpose set forth.

4. A weedless fishhook including a shank provided with stops arranged in spaced relation to each other, and a guard embodying a sleeve mounted for revoluble and longitudinal sliding movement on said shank between said stops, said sleeve being formed at one end with slits, and a crimped bead intersected by said slits, and prongs extending outwardly and downwardly from said sleeve and through said slits and comprising portions that are clenched in the crimped bead, as and for the purpose set forth.

5. A weedless fishhook, including a shank provided with upper and lower stops disposed in spaced relation to each other, a sleeve mounted for revoluble and longitudinal sliding movement on said shank between said stops, and prongs secured to said sleeve and extending outwardly and downwardly therefrom, the sleeve being provided with blades, for the purpose specified.

In testimony whereof I affix my signature in the presence of two witnesses.

JAMES WILLIAM JAY.

Witnesses:
  M. Prehn,
  M. H. Hood.